United States Patent Office 3,041,379
Patented June 26, 1962

3,041,379
BROMOTRINITROPENTANONE
Harry D. Anspon, Easton, Pa., assignor to United States Rubber Company, New York, N.Y., a corporation of New Jersey
No Drawing. Filed July 7, 1950, Ser. No. 172,625
1 Claim. (Cl. 260—593)

This invention relates to a new compound, a bromotrinitropentanone. The new compound is potentially useful as an explosive and/or propellant.

The new compound of my invention is a bromotrinitropentanone boiling at 107.5° C. at 3 mm. Hg, melting at 24–25° C., and having a refractive index ($N_D^{20}$) of 1.499. It is made by reacting bromotrinitromethane with methyl vinyl ketone. These reactants are brought together, preferably in equimolar proportions and preferably in a suitable mutual solvent such as anhydrous ether. Upon standing for several hours, the reaction mixture is treated to recover the reaction product, conveniently by vacuum distillation.

The reaction is probably as follows:

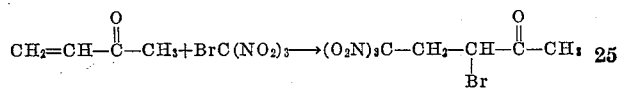

The product is believed to be 3-bromo-1,1,1-trinitro-4-pentanone, as shown. The possibility that it is the isomeric 1-bromo-2-(trinitromethyl)-3-butanone has not been eliminated.

In the following example parts are by weight except as noted.

*Example*

To a solution of 3.45 parts (0.015 mol) of bromotrinitromethane in 5 parts (by vol.) of anhydrous ether are added 1.05 parts (0.015 mol) of methyl vinyl ketone, causing a moderate rise of temperature. After remaining at room temperature for several hours the solution is distilled in vacuo, thereby obtaining 3.63 parts of a bromotrinitropentanone, a light yellow liquid boiling at 107.5° C. at 3 mm. Hg, melting at 24–25°, and having a refractive index ($N_D^{20}$) of 1.4987. It has a blue-green fluorescence and a pleasant ketone-like odor. It burns easily, but does not detonate easily from the shock of a hammer blow.

*Analysis.*—Calcd. for $C_5H_6N_3BrO_7$: carbon, 20.02%; hydrogen, 2.02%; nitrogen, 14.00%. Found: Carbon, 20.27%; hydrogen, 1.85%; nitrogen, 14.03%.

I claim:

As a compound, a bromotrinitropentanone boiling at 107.5° C. at 3 mm. Hg, melting at 24–25° C., and having a refractive index ($N_D^{20}$) of 1.499.

References Cited in the file of this patent

Kohler: J. Am. Chem. Soc., vol. 38, pages 889–900 (1916).

Reichert et al.: Arch. Pharm., vol. 275, pages 67–83 (1937).